(12) United States Patent
Yang

(10) Patent No.: US 11,963,568 B2
(45) Date of Patent: Apr. 23, 2024

(54) BONDING DEVICE AND METHOD OF USING BONDING DEVICE

(71) Applicant: Unipros Camping Products Company Limited, Xiamen (CN)

(72) Inventor: Yonggeng Yang, Xiamen (CN)

(73) Assignee: Unipros Camping Products Company Limited, Xiamen (CN)

( * ) Notice: Subject to any disclaimer, the term of this patent is extended or adjusted under 35 U.S.C. 154(b) by 0 days.

(21) Appl. No.: 17/962,630

(22) Filed: Oct. 10, 2022

(65) Prior Publication Data

US 2024/0000176 A1   Jan. 4, 2024

(30) Foreign Application Priority Data

Jul. 1, 2022   (CN) ......................... 202210766862.X

(51) Int. Cl.
| | | |
|---|---|---|
| *A41H 43/04* | (2006.01) | |
| *B29C 65/00* | (2006.01) | |
| *B29C 65/10* | (2006.01) | |
| *B29C 65/48* | (2006.01) | |
| *B32B 37/10* | (2006.01) | |
| *B32B 37/12* | (2006.01) | |

(52) U.S. Cl.
CPC ........... *A41H 43/04* (2013.01); *B29C 66/845* (2013.01); *B29C 65/103* (2013.01); *B29C 65/4815* (2013.01); *B29C 66/1122* (2013.01); *B32B 37/10* (2013.01); *B32B 2037/1215* (2013.01)

(58) Field of Classification Search
CPC ...... A41H 43/04; B29C 66/845; B29C 65/103
See application file for complete search history.

(56) References Cited

U.S. PATENT DOCUMENTS

| | | | | |
|---|---|---|---|---|
| 2009/0199970 | A1* | 8/2009 | Cartabbia | ............... B29C 66/43 156/497 |
| 2011/0048645 | A1* | 3/2011 | Nakata | ............. B29C 66/91421 156/380.6 |
| 2015/0181962 | A1* | 7/2015 | Cartabbia | ............... B29C 66/43 428/58 |

FOREIGN PATENT DOCUMENTS

| | | | | |
|---|---|---|---|---|
| EP | 0032703 | A1 * | 1/1981 | ............. B29C 27/08 |
| EP | 1958525 | A1 * | 8/2008 | ............. A41D 27/24 |

* cited by examiner

*Primary Examiner* — Scott W Dodds
(74) *Attorney, Agent, or Firm* — Cooper Legal Group LLC

(57) ABSTRACT

A bonding device comprises a body, a cloth guiding-and-heating device, a roll-pressing device, a plate-pressing device, a hot air device, and a tape-delivering device. The cloth guiding-and-heating device, the roll-pressing device, the plate-pressing device, and the tape-delivering device are disposed on the body. The cloth guiding-and-heating device comprises a cloth guiding seat comprising a first cloth guiding groove having a first opening, a material guiding groove, and a second cloth guiding groove having a second opening. The first opening and the second opening face away from each other. The material guiding groove is configured to guide a tape. The cloth guiding seat is disposed with two blowing pipes in communication with the hot air device. The roll-pressing device is configured for roll-pressing and bonding clothes and the tape, and the plate-pressing device is configured for plate-pressing and bonding the clothes and the tape.

10 Claims, 16 Drawing Sheets

BONDING DEVICE AND METHOD OF USING BONDING DEVICE

RELATED APPLICATIONS

This application claims priority to Chinese patent application number 202210766862.X, filed on Jul. 1, 2022. Chinese patent application number 202210766862.X is incorporated herein by reference.

FIELD OF THE DISCLOSURE

The present disclosure relates to a bonding device and a method of using the bonding device.

BACKGROUND OF THE DISCLOSURE

At present, a bonding device, specifically a seam sealing machine, is widely used in splicing of tent, raincoat, waterproof clothing, and other fabrics. A hot-melt tape is blown and heated through a hot air pipe, so that a fabric and the hot-melt tape are bonded and connected after being rolled by a rubber wheel to achieve a sealing effect. However, at a connection between an edge of the fabric and the hot-melt tape, during an operation process, an overlapping position of the edge of the fabric and the hot-melt tape is prone to offset, resulting in a decrease in a bonding quality of a product. In addition, at present, most manufacturers are limited by equipment. For the bonding of double-layer fabrics, manufacturers often have multiple processing and bonding steps. After one layer of fabric is bonded to one side of the tape, another layer of fabric is bonded to the other side of the tape. The whole bonding process is cumbersome, which greatly reduces the work efficiency.

BRIEF SUMMARY OF THE DISCLOSURE

The present disclosure provides a bonding device and a method of using the bonding device to solve the deficiencies in the background to improve a bonding quality between clothes and a tape and improve a working efficiency.

In order to solve the technical problem, a first technical solution of the present disclosure is as follows.

A bonding device comprises a body, a cloth guiding-and-heating device, a roll-pressing device, a plate-pressing device, a hot air device, and a tape-delivering device. The cloth guiding-and-heating device, the roll-pressing device, the plate-pressing device, and the tape-delivering device are disposed on the body, and the cloth guiding-and-heating device comprises a cloth guiding seat. The cloth guiding seat comprises a first cloth guiding groove, a material guiding groove, and a second cloth guiding groove which are spaced apart from one another and arranged in sequence from bottom to top. The first cloth guiding groove has a first opening extending along one side of a width direction of the first cloth guiding groove, and the second cloth guiding groove has a second opening extending along one side of a width direction of the second cloth guiding groove. The first opening and the second opening face away from each other, and the first opening and the second opening are configured to respectively receive a first cloth of clothes and a second cloth of the clothes to enable the first cloth of the clothes and the second cloth of the clothes to partially overlap each other in a vertical projection plane. The material guiding groove is configured to guide tape to enable the tape to enter between the first cloth of the clothes and the second cloth of the clothes, and the cloth guiding seat is disposed with two blowing pipes at an exit of the material guiding groove. The two blowing pipes are spaced apart from each other so that the tape is configured to pass through between the two blowing pipes, and the two blowing pipes are in communication with the hot air device. The roll-pressing device comprises a lower rubber wheel, an upper rubber wheel, and a first lifting assembly for driving the upper rubber wheel to ascend or descend, and the roll-pressing device is configured for roll-pressing and bonding the clothes and the tape. The plate-pressing device comprises a lower pressing plate, an upper pressing plate, and a second lifting assembly for driving the upper pressing plate to ascend or descend, and the plate-pressing device is configured for plate-pressing and bonding the clothes and the tape.

In preferred embodiment, the hot air device comprises a first hot air device located above a countertop of the body and a second hot air device located below the countertop of the body, and the first hot air device comprises a first hot air pipe and a first air outlet pipe. A first air passage switching member is connected between the first hot air pipe and the first air outlet pipe, and the first air passage switching member is configured to control a connection or a disconnection between the first hot air pipe and the first air outlet pipe. The first hot air pipe is configured to supply hot air to heat the upper rubber wheel and an upper layer of the clothes, and the second hot air device comprises a second hot air pipe and a second air outlet pipe. A second air passage switching member is connected between the second hot air pipe and the second air outlet pipe, and the second air passage switching member is configured to control a connection or a disconnection between the second hot air pipe and the second air outlet pipe. An upper end of the lower rubber wheel is exposed above the countertop to enable the clothes and tape to be horizontally pushed along a surface of the countertop when the clothes and tape are being bonding between the upper rubber wheel and the lower rubber wheel, and a side wall of the second air outlet pipe comprises a first air outlet. The first air outlet faces the lower rubber wheel and a lower layer of the clothes, and a distal end of the second air outlet pipe is in communication with the two blowing pipes.

In preferred embodiment, the first air passage switching member comprises a switching sleeve and a movable plug, and an air exhausting outlet, an air inlet, and an air outlet of the first air outlet pipe are sequentially formed on the switching sleeve. The air inlet is in communication with the first hot air pipe, and the air outlet is in communication with the first air outlet pipe. The air exhausting outlet is connected with a first air exhausting pipe, and the movable plug is movably disposed in the switching sleeve. When the movable plug blocks communication between the air exhausting outlet and the air inlet, the air inlet is in communication with the air outlet, and when the movable plug blocks communication between the air outlet and the air inlet, the air inlet is in communication with the air exhausting outlet. The first air passage switching member is the same as the second air passage switching member.

In preferred embodiment, the cloth guiding seat comprises a first direction-changing roller and a second direction-changing roller, and the cloth guiding seat comprises a first direction-changing opening extending along a width direction of the material guiding groove. The first direction-changing opening and the first opening face a same side, and the first direction-changing roller is rotatably disposed on the first direction-changing opening so that the tape is configured to move along the first direction-changing roller to enter the material guiding groove. The cloth guiding seat comprises a second direction-changing opening at one end of the material guiding groove away from the exit of the material guiding groove, and the second direction-changing roller is rotatably disposed on the second direction-changing opening, so that the tape is configured to enter the material guiding groove from the first direction-changing opening, move along the first direction-changing roller, then move toward the second direction-changing opening to move out of the material guiding groove, and then move along the second direction-changing roller to turn into the material guiding groove so as to move in a direction in which the exit of the material guiding groove faces.

In preferred embodiment, a partition plate is disposed in the material guiding groove to divide the material guiding groove into an upper layer and a lower layer, and the upper layer of the material guiding groove is configured for moving of the tape toward the second direction-changing roller after a direction of the tape is changed by the first direction-changing roller. The lower layer of the material guiding groove is configured for moving of the tape toward the exit of the material guiding groove after the direction of the tape is changed by the second direction-changing roller.

In preferred embodiment, the cloth guiding-and-heating device comprising a rotating seat and a fixed seat, and the cloth guiding seat is disposed on the rotating seat. The rotating seat is rotatably disposed on the fixed seat, and the fixed seat is disposed on a bottom a countertop. An adjustment assembly for controlling a rotation angle of the rotating seat is disposed on the fixed seat.

In preferred embodiment, the adjustment assembly comprises an adjustment rod, a screw rod, and an adjustment block, and the screw rod is rotatably disposed on a bottom of the fixed seat. The adjustment block is sleeved on the screw rod and is threadly connected with the screw rod, and one end of the rotating seat is pivotally connected to the fixed seat to enable the rotating seat to rotate in a horizontal plane. The fixed seat comprises an arc-shaped groove, and the arc-shaped groove is centered on a hinge position of the rotating seat. The adjustment rod is connected to the rotating seat and extends through the arc-shaped groove, and the adjustment block comprises a clamping groove clamped on two sides of the adjustment rod.

In preferred embodiment, the tape-delivering device comprises a tape reel, a tensioning wheel group, and a driving wheel group, and the tape is configured to be wound on the tape reel, the tensioning wheel group, and the driving wheel group in sequence before entering the cloth guiding-and-heating device. The tensioning wheel group has a staggered structure in height for the tape being wound on the tensioning wheel group along a staggered path in height, and the driving wheel group comprises a driving wheel and an adjusting wheel. The driving wheel is configured to be driven by a second motor with a forward and reverse function, and the adjusting wheel is configured to be adjusted by an adjusting bolt to adjust a distance between the adjusting wheel and the driving wheel so as to enable the tape to pass through between the driving wheel and the adjusting wheel. The tape reel is configured to be driven by a motor, and the tape reel and the driving wheel are configured to rotate synchronously to enable delivering speeds of the tape at positions wound on the tape reel and the driving wheel to be same.

In preferred embodiment, the tensioning wheel group comprises a plurality of tensioning wheels and a lifting wheel, and a lifting rail is disposed on the body. The lifting wheel slides on the lifting rail through a slider, and a lower end of the lifting rail comprises a position-limiting rod for preventing the lifting wheel from disengaging from the lower end of the lifting rail. The tape is configured to pass by the lower end of the lifting wheel, and when the driving wheel rotates in a reverse direction and drives the tape to retreat, the lifting wheel presses the tape under an action of a weight of the lifting wheel to maintain a tension state of the tape.

A second technical solution of the present disclosure is as follows.

A method of using the bonding device, comprises the following steps:
S1: pulling out the tape wound on a tape reel, and winding the tape along a tensioning wheel group and a driving wheel group in sequence to make the tape pass through the cloth guiding-and-heating device;
S2: pulling the tape to the lower pressing plate;
S3: inserting a first layer of the clothes into the first cloth guiding groove, and pushing the first layer of the clothes along the first cloth guiding groove to move to the lower pressing plate so as to make the first layer of the clothes located under the tape;
S4: inserting a second layer of the clothes into the second cloth guiding groove, and pushing the second layer of the clothes along the second cloth guiding groove to move to the lower pressing plate so as to make the second layer of the clothes located above the tape;
S5: starting the plate-pressing device, after the upper pressing plate is heated, making the upper pressing plate move toward the lower pressing plate so as to enable the first layer of the clothes, the second layer of the clothes, and a beginning of the tape to be bonded together, and making the upper pressing plate be lifted;
S6: starting the roll-pressing device, making the upper rubber wheel press toward the lower rubber wheel, making the hot air device supply hot air to the upper rubber wheel, the lower rubber wheel, the first layer of the clothes, the second layer of the clothes, and the tape, and making the upper rubber wheel and the lower rubber wheel rotate to enable the first layer of the clothes, the second layer of the clothes, and the tape to be roll-pressed and bonded together and to be pushed toward a direction away from an operator;
S7: when other objects need to be bonded into the clothes which are unbonded, suspending the roll-pressing device, moving a portion to be bonded to the plate-pressing device for bonding, and repeating the step S6;
S8: when a distal end of the first layer of the clothes and a distal end of the second layer of the clothes needs to be ended and bonded, suspending the roll-pressing device, and moving the distal end of the first layer of the clothes and the distal end of the second layer of the clothes to the plate-pressing device for thermal bonding; and
S9: after completing a bonding of a product, cutting the tape; and repeating steps S2-S8 to continue a bonding of a next product.

The technical solution has the following advantages.

1. The tape is reversed through the cloth guiding-and-heating device to avoid interference between the tape and the two layers of the clothes. The two layers of the clothes are guided by the first cloth guiding groove and the second cloth guiding groove respectively, so that during a bonding process, the clothes and the tape can be kept flat and improve the bonding quality. An arrangement of the roll-pressing device and the plate-pressing device can be selected on a same machine according to the needs of the operator to improve an applicability. In addition, under an action of the cloth guiding-and-heating device and the hot air device, the roll-pressing device can complete a bonding of the two layers of the clothes and the tape at one time, which greatly improves the work efficiency.

2. When the first hot air device and the second hot air device blow out the hot air at the same time, the first air outlet pipe blows and heats the upper layer of the clothes and the upper rubber wheel, and the second air outlet pipe blows and heats the lower layer of the clothes and the lower rubber wheel. In addition, the distal end of the second air outlet pipe is connected with the two blowing pipes through the flexible hose, and an upper one of the two blowing pipes located above the tape blows and heats an upper surface of the tape. At the same time, a lower one of the two blowing pipes located below the tape blows and heats a lower surface of the tape, and the hot air can be reflected to a lower surface of the upper layer of the clothes for heating. In this way, under an action of the hot air device and the two blowing pipes, the upper surfaces and lower surfaces of the upper layer and the lower layer of the clothes and the tape can be heated before being rolled and bonded by the upper rubber wheel and the lower rubber wheel; the bonding effect is improved.

3. In an arrangement of the first air passage switching member, the hot air can be controlled to be discharged from the first air outlet pipe or the first air exhausting pipe to avoid scalding the operator; similarly, the second air passage switching member controls the second air outlet pipe or the second exhausting pipe to discharge the hot air.

4. An arrangement of the tape reel, the driving wheel group, and the tensioning wheel group enable the tape to be pulled to move towards the cloth guiding-and-heating device. Because the tape reel actively sends the tape out, it can effectively avoid the tape being broken due to excessive tension. When the tape needs to retreat for a certain length, the motor drives the driving wheel to reverse, so that the tape is retracted. At this time, under an action of a weight of the lifting wheel, the lifting wheel keeps the tape tensioned on the tensioning wheel group to prevent the tape from falling off when the tape is retracted.

5. Through an arrangement of the adjustment assembly, the rotating seat can be controlled to drive the cloth guiding seat to rotate at a certain angle, so as to guide the curved edges of the clothes, so that the roll-pressing device can smoothly bond the curved edges of the clothes.

DETAILED DESCRIPTION OF THE EMBODIMENTS

Figure 1:
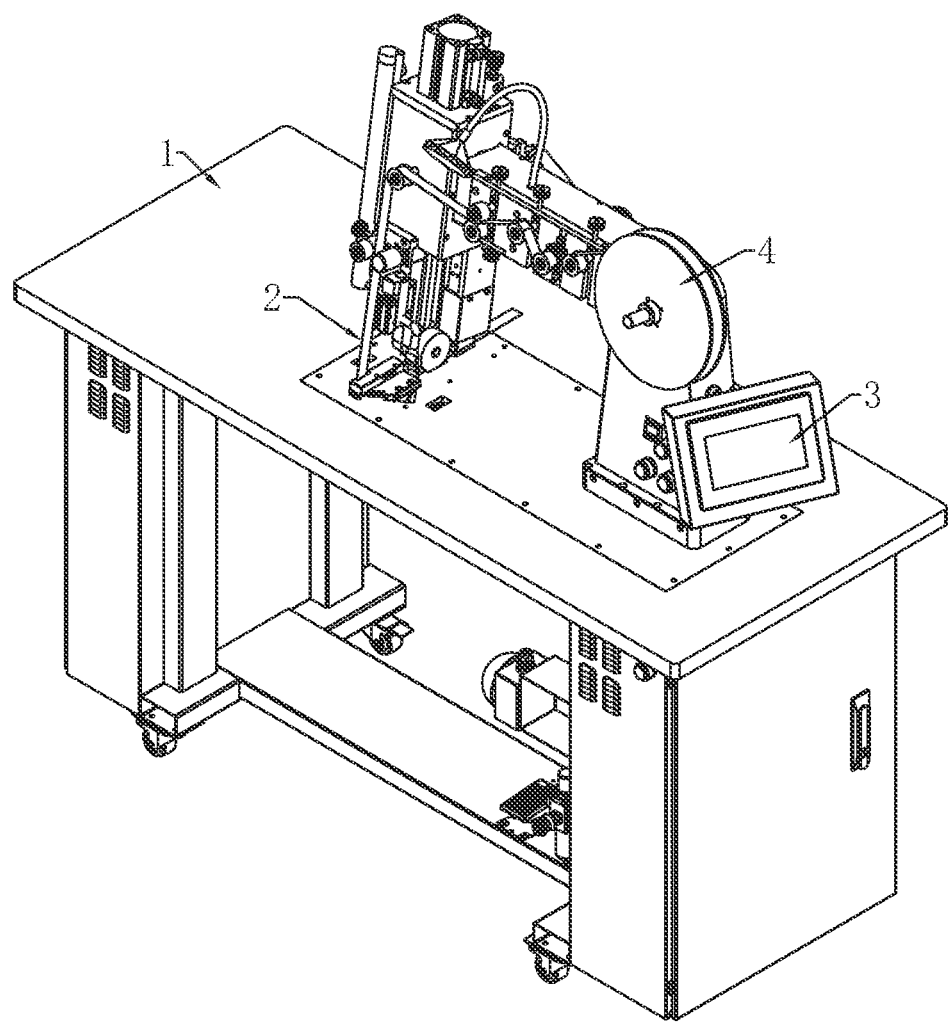
FIG. 1 illustrates a perspective view of the present embodiment.
Figure 2:
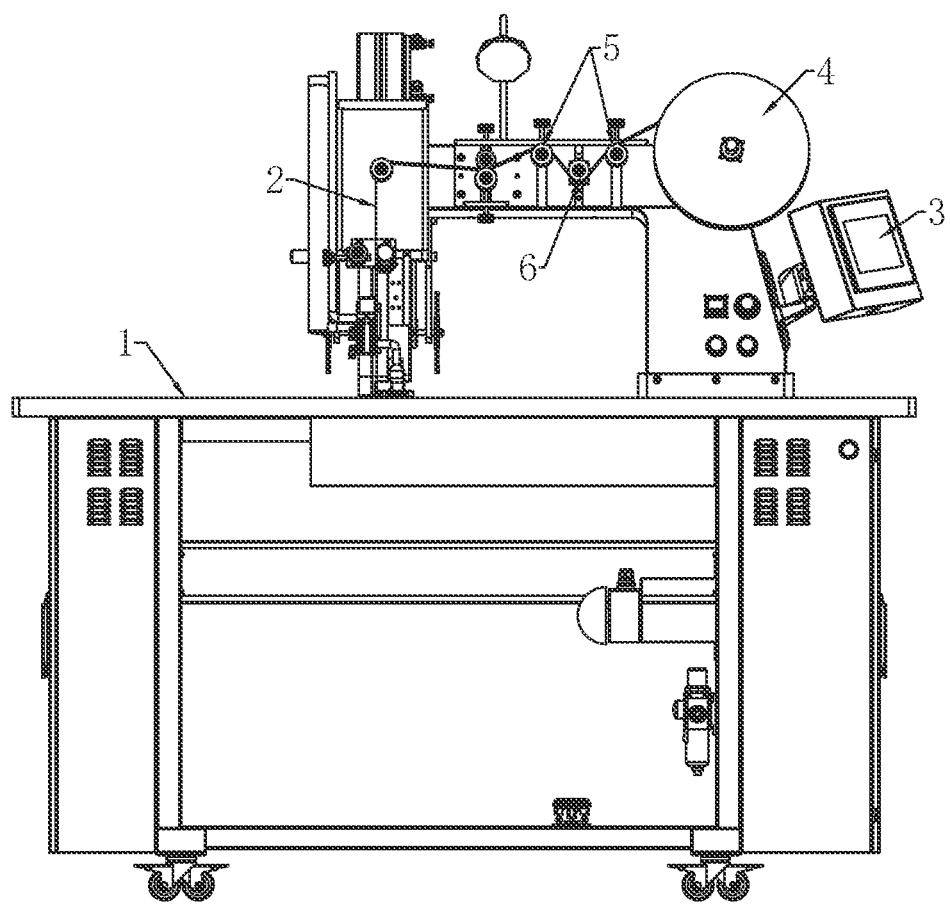
FIG. 2 illustrates a front view of the present embodiment.
Figure 3:
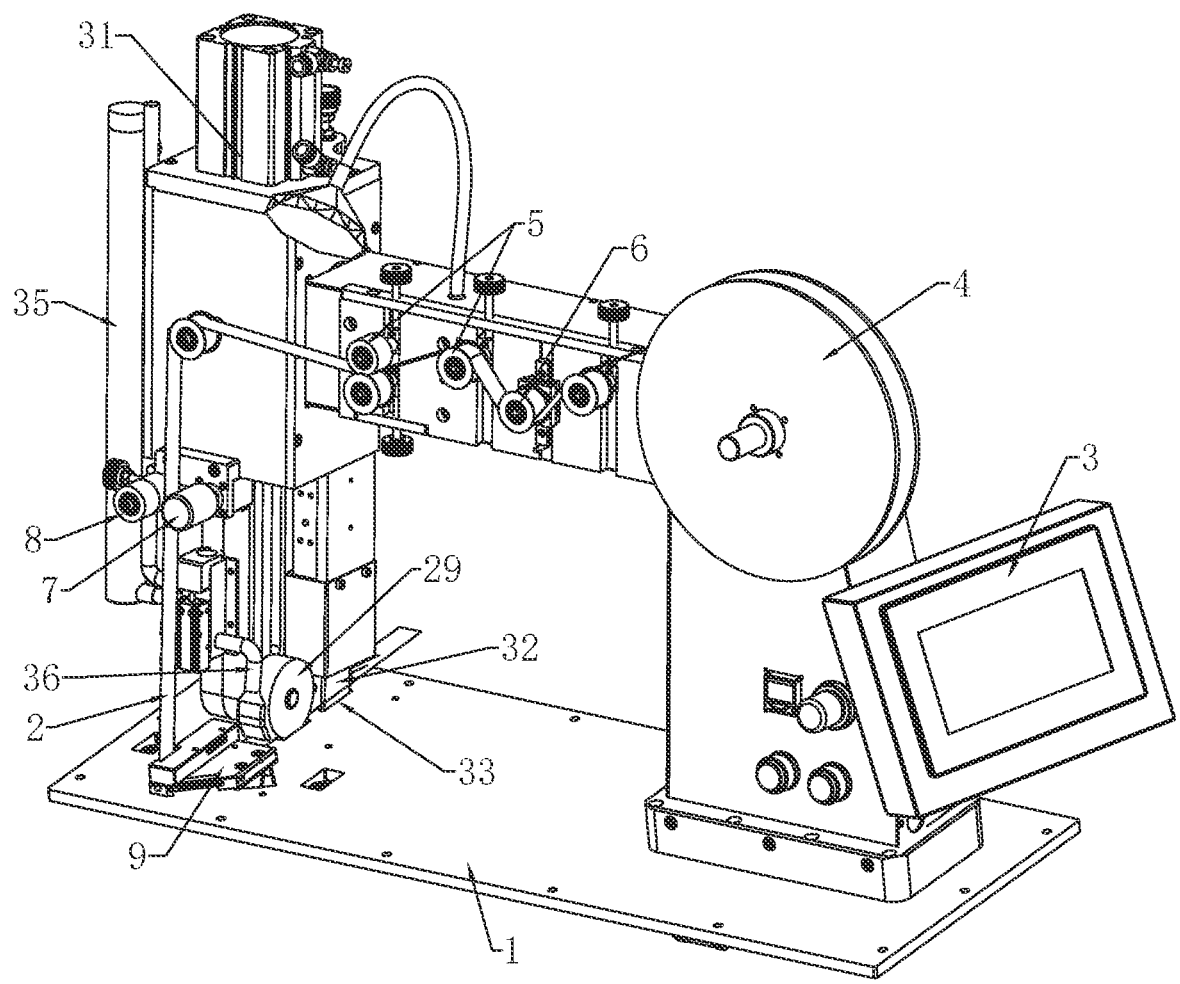
FIG. 3 illustrates a perspective view of each device on a countertop of a body in the present embodiment.
Figure 4:
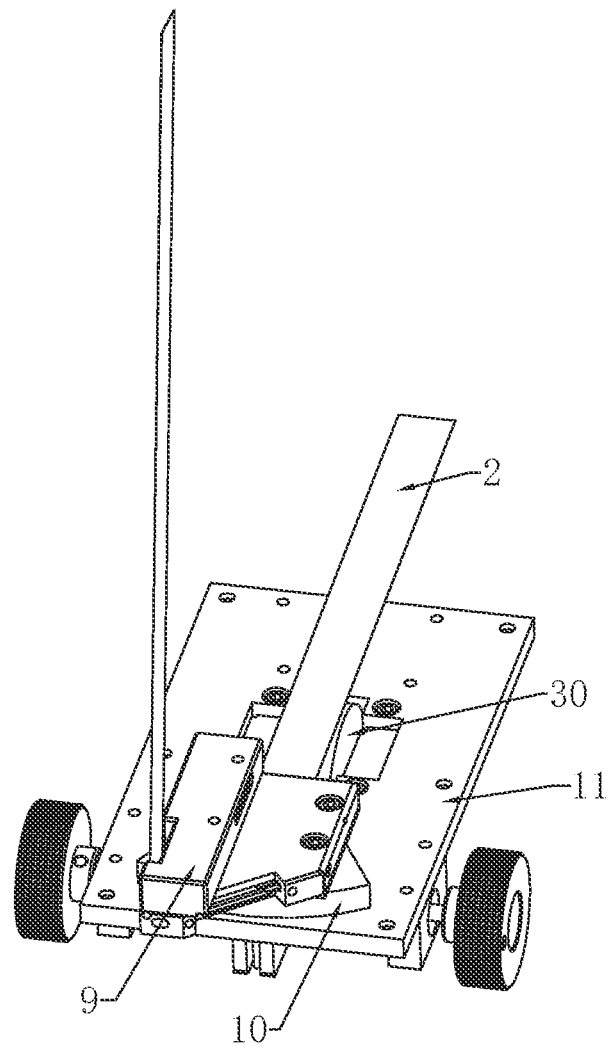
FIG. 4 illustrates a perspective view of a cloth guiding-and-heating device in the present embodiment.
Figure 5:
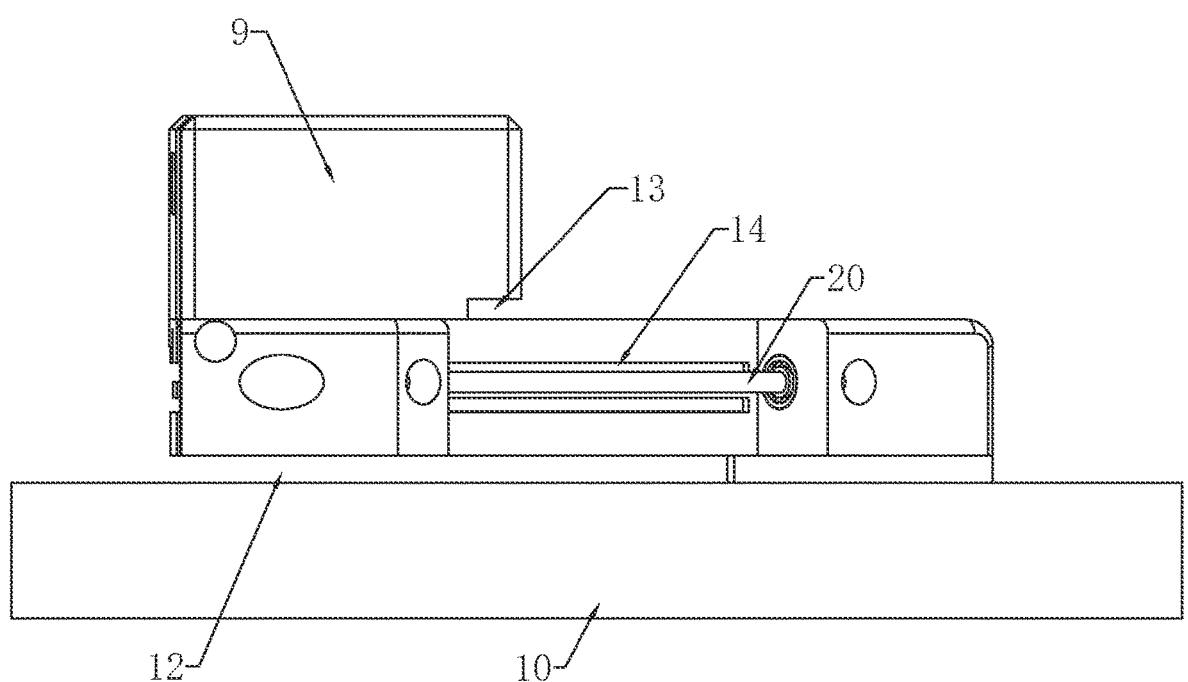
FIG. 5 illustrates a front view of a cloth guiding seat and a rotating seat in the present embodiment.
Figure 6:
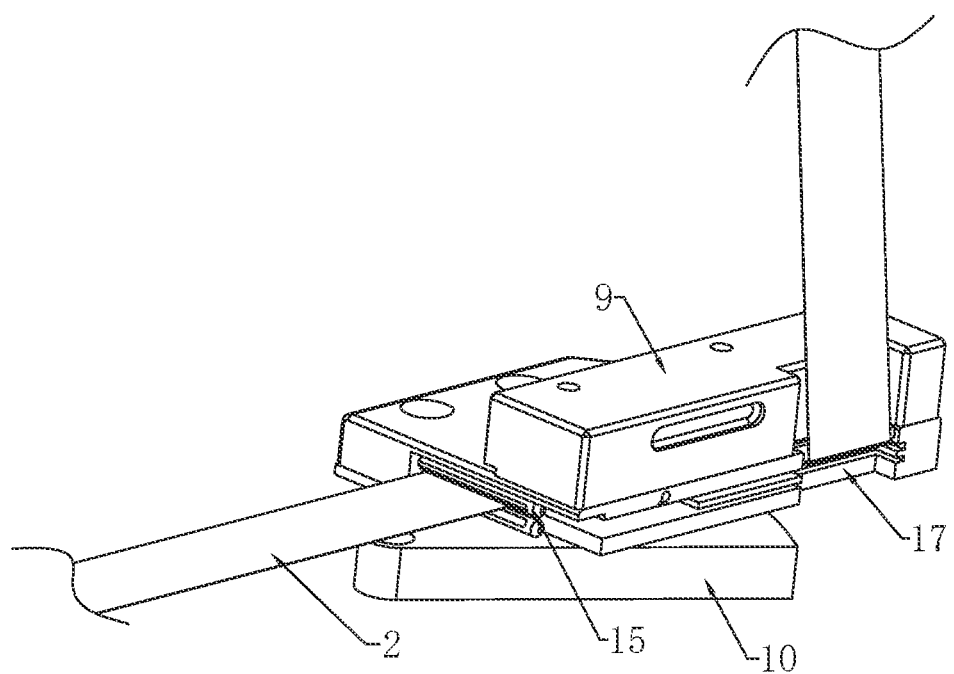
FIG. 6 illustrates a perspective view of the cloth guiding seat, showing two blowing pipes and a tape in the present embodiment.
Figure 7:
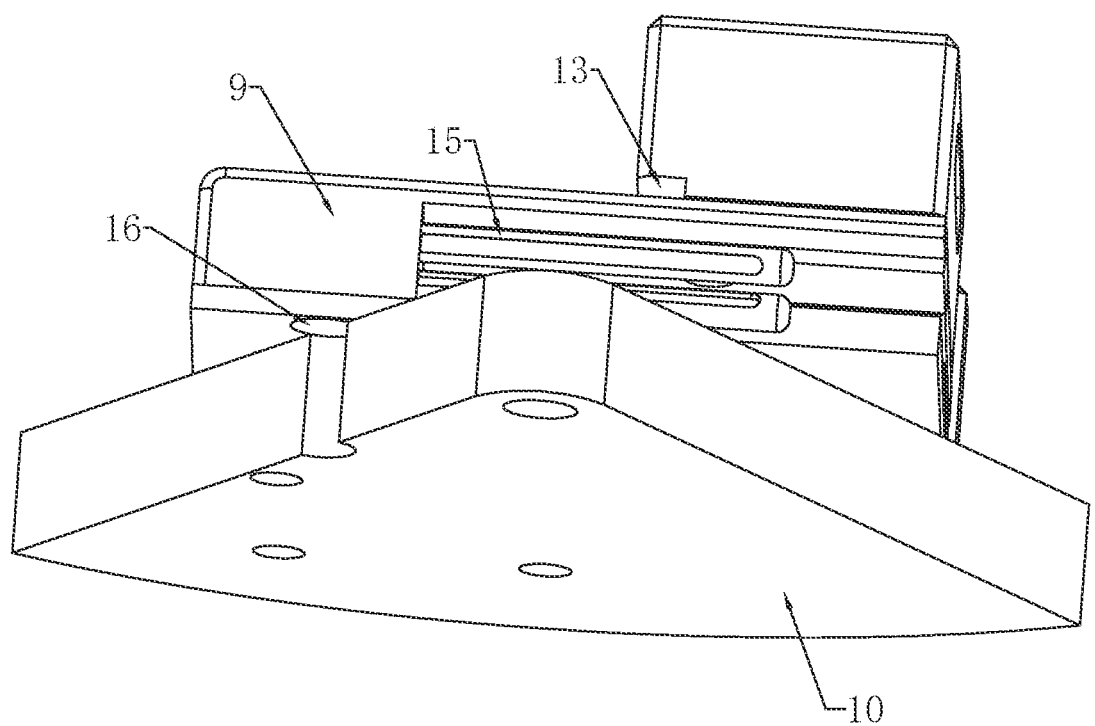
FIG. 7 illustrates a perspective view of the two blowing pipes, the cloth guiding seat, and the rotating seat in the present embodiment.
Figure 8:
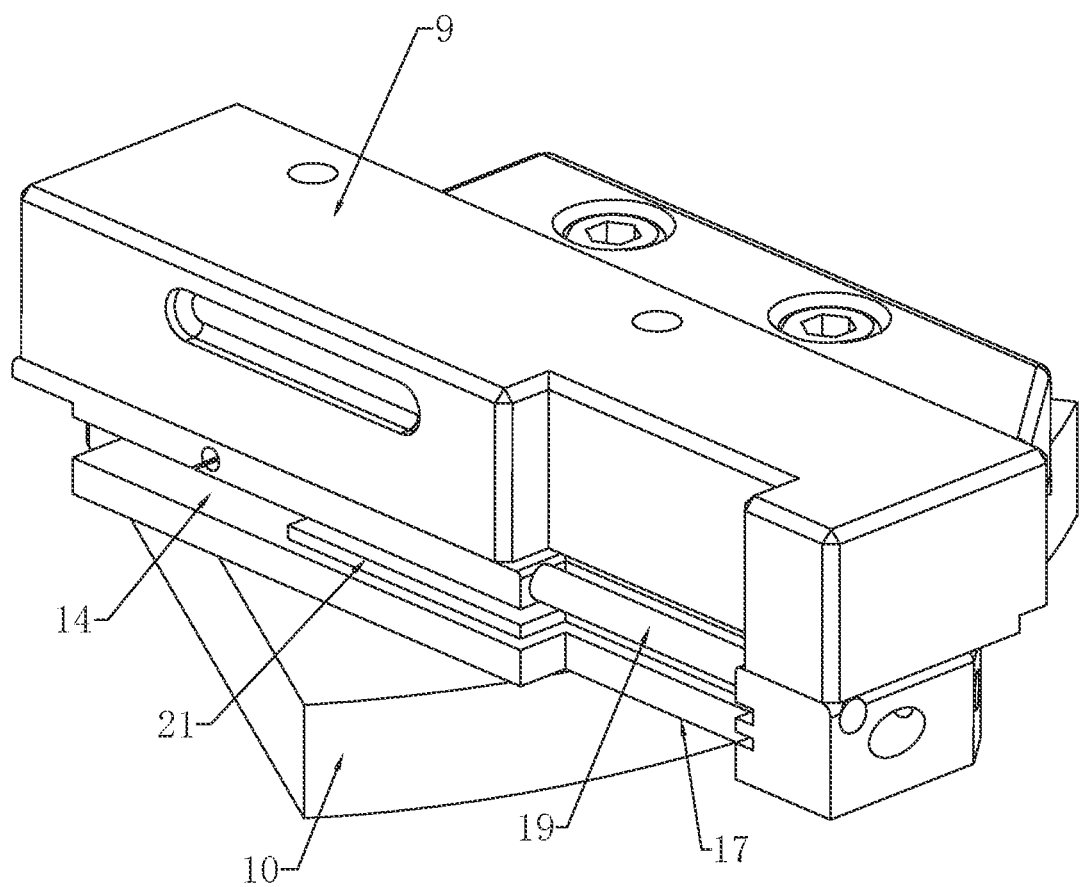
FIG. 8 illustrates a perspective view of a first direction-changing roller in the present embodiment.
Figure 9:
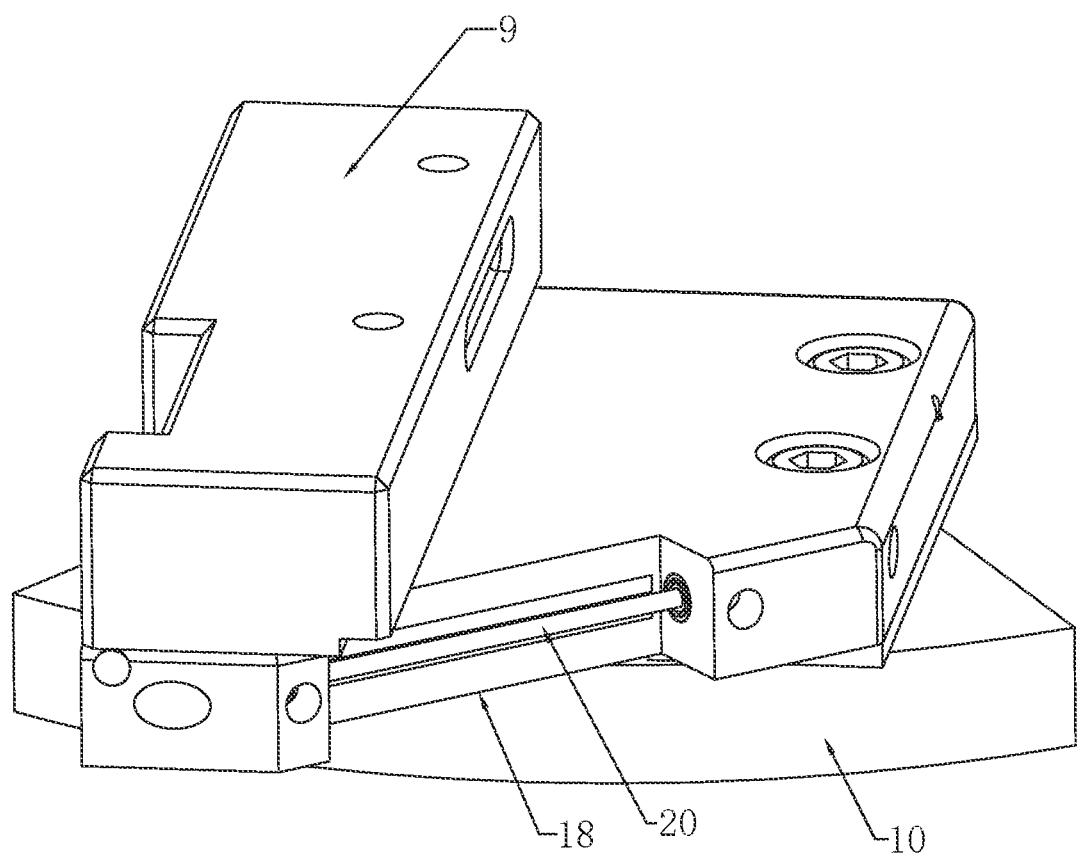
FIG. 9 illustrates a perspective view of a second direction-changing roller in the present embodiment.
Figure 10:
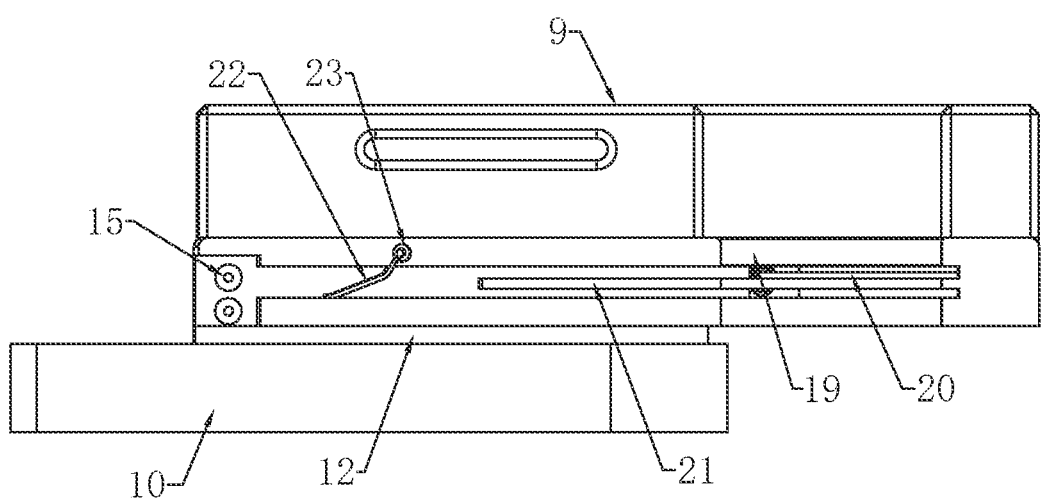
FIG. 10 illustrates a side view of the cloth guiding seat and the rotating seat in the present embodiment.
Figure 11:
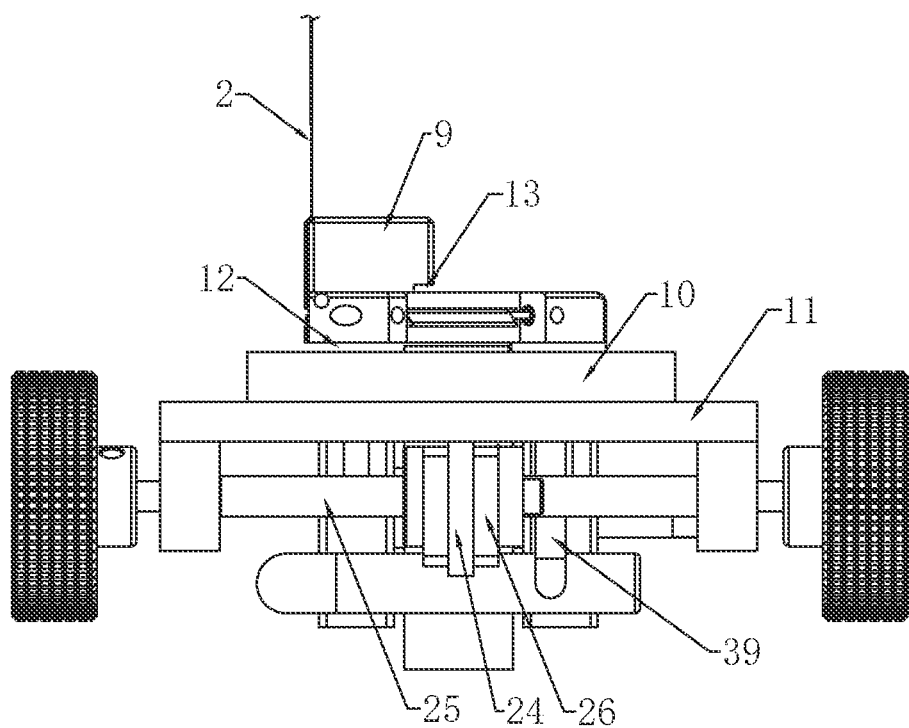
FIG. 11 illustrates a front view of the cloth guiding-and-heating device and a second air outlet pipe in the present embodiment.
Figure 12:
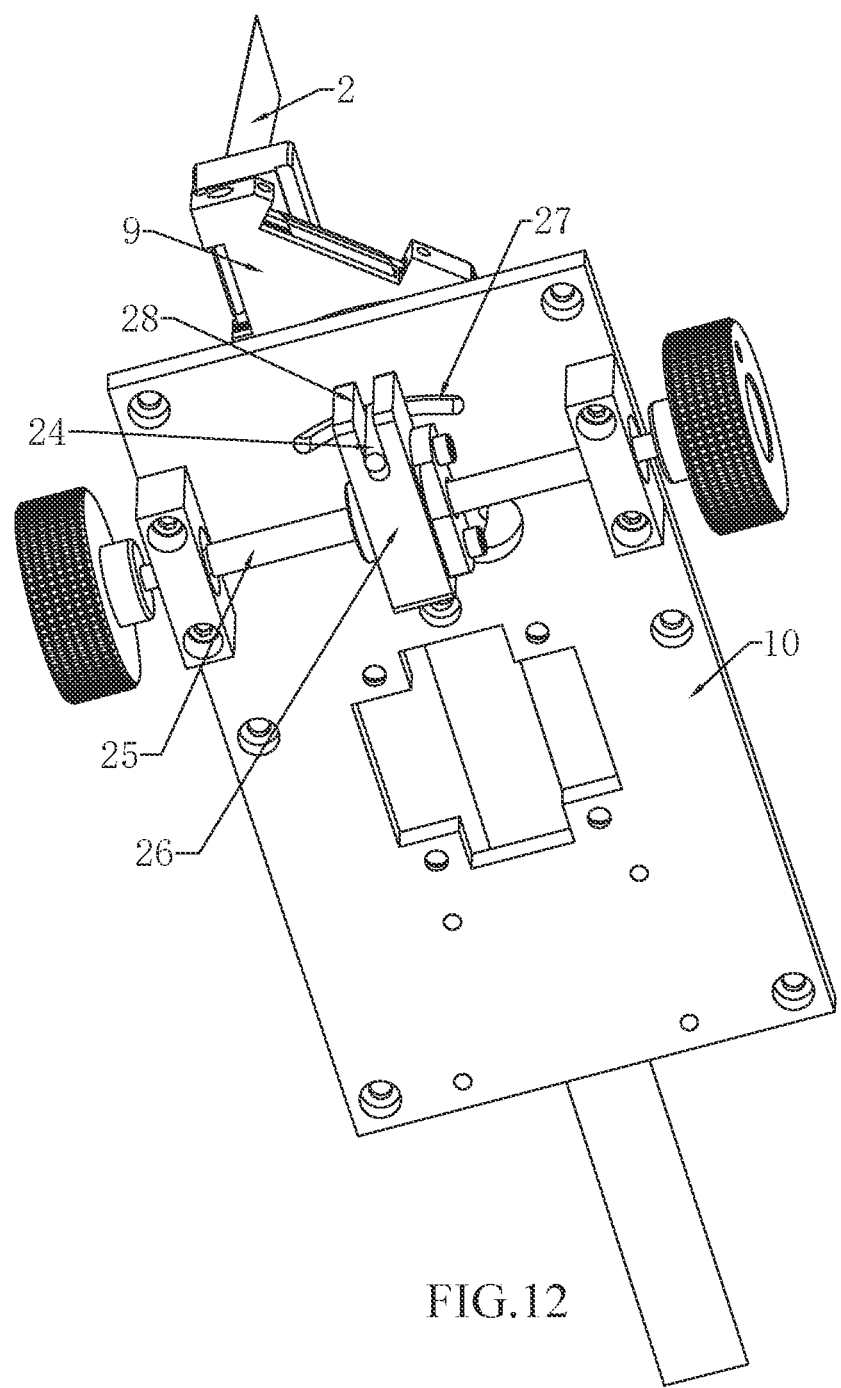
FIG. 12 illustrates a perspective view of the cloth guiding-and-heating device and an adjustment assembly in the present embodiment.
Figure 13:
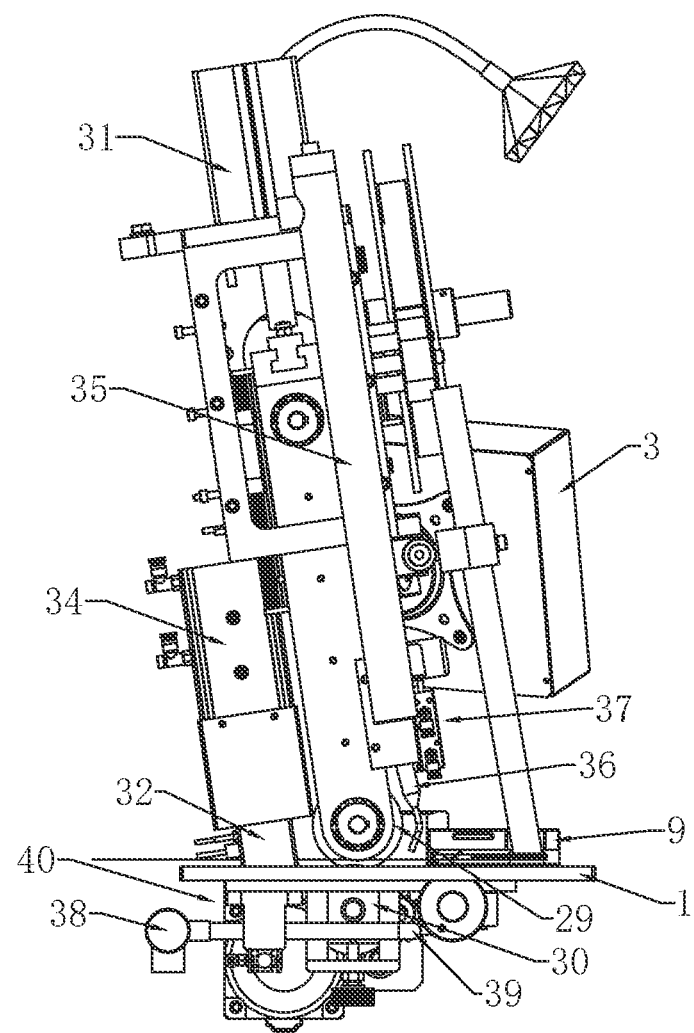
FIG. 13 illustrates a side view of each device on the countertop in the present embodiment.
Figure 14:
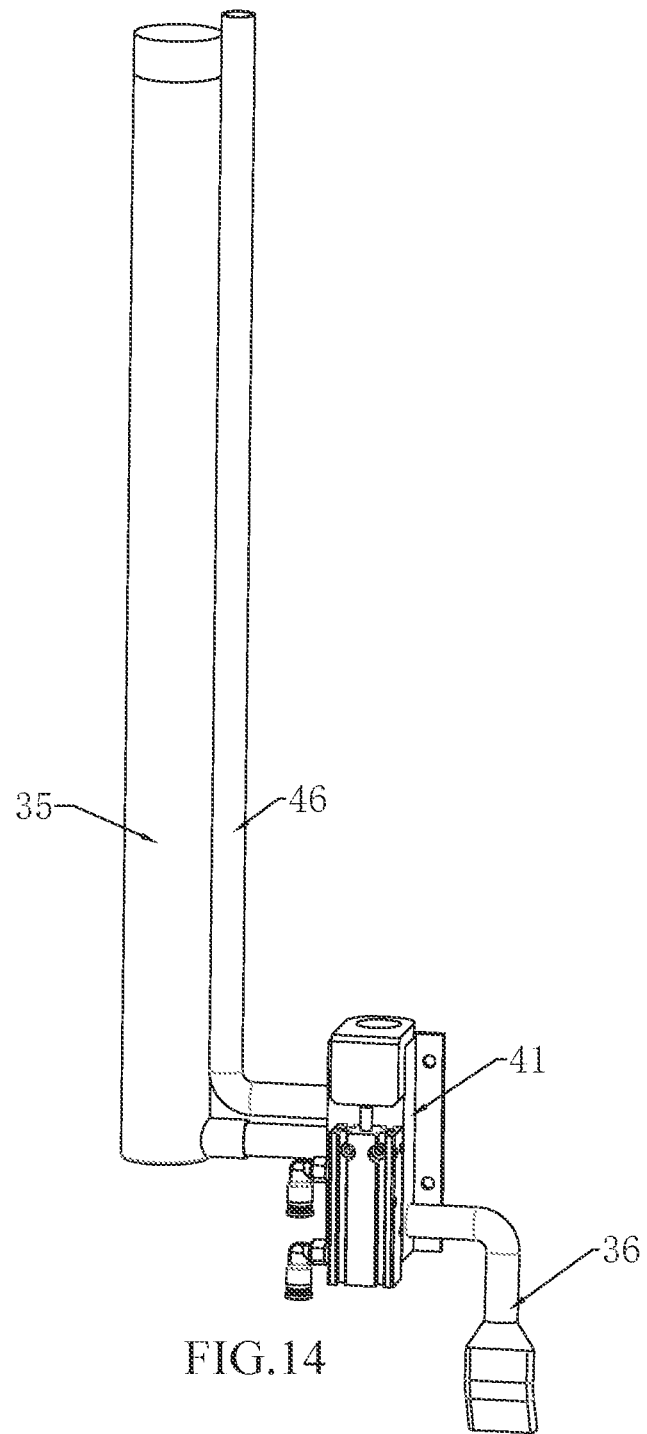
FIG. 14 illustrates a perspective view of a first hot air device in the present embodiment.
Figure 15:
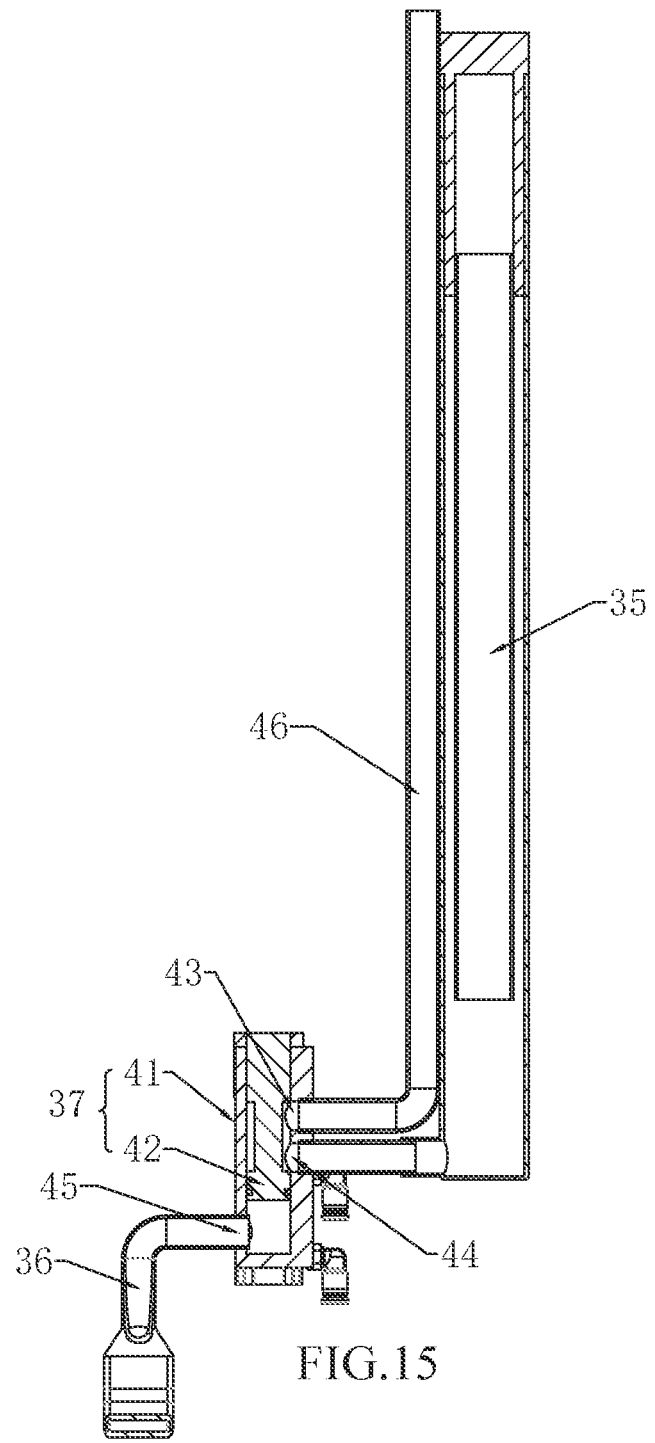
FIG. 15 illustrates a cross-sectional view of the first hot air device in the present embodiment.
Figure 16:
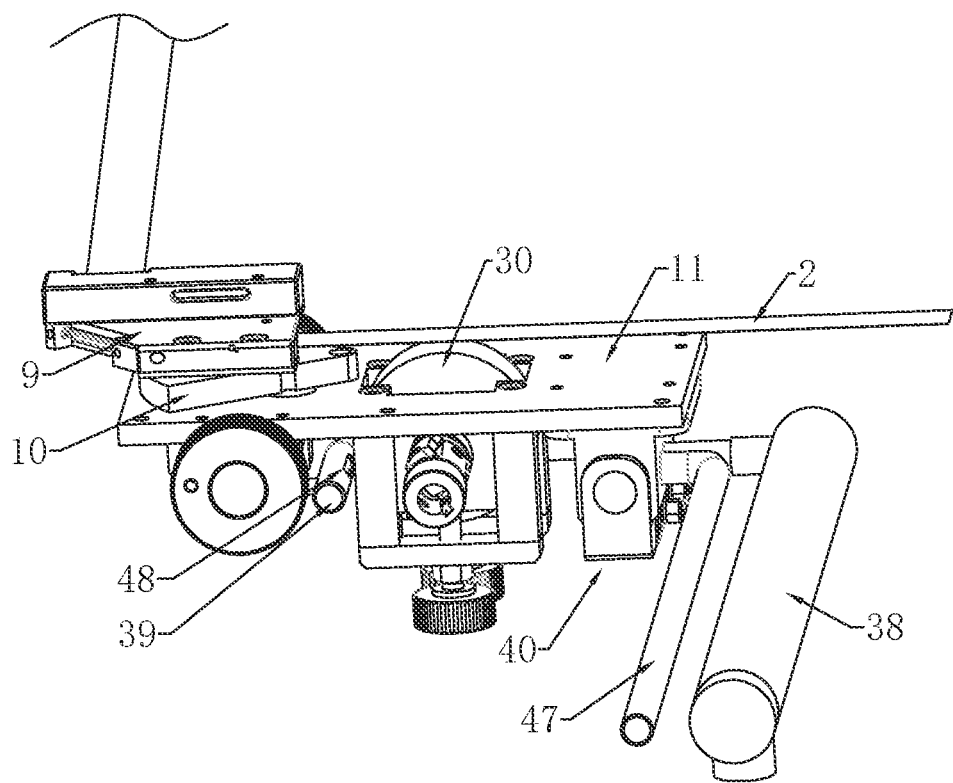
FIG. 16 illustrates a perspective view of a second hot air device in the present embodiment.

The present disclosure will be further described below in combination with the accompanying drawings and embodiments.

The embodiment of the present disclosure discloses a bonding device, and the bonding device comprises a body 1, a cloth guiding-and-heating device, a roll-pressing device, a plate-pressing device, a hot air device, and a tape-delivering device. In a vertical projection plane, the cloth guiding-and-heating device, the roll-pressing device, and the plate-pressing device are disposed on the body 1 and arranged in sequence from a side of the body 1 adjacent to an operator to a side of the body 1 away from the operator. The cloth guiding-and-heating device is disposed on a countertop of the body 1, and the roll-pressing device and the plate-pressing device are disposed at a distal end of a cantilever of the body 1. The hot air device is used to supply hot air to heat rollers, clothes, and a tape 2. The tape-delivering device is used to deliver the tape 2. An integrated controller 3 is also disposed on the body 1 for controlling each device to work.

The tape-delivering device is described as follow.

The tape-delivering device comprises a tape reel 4, a tensioning wheel group, and a driving wheel group. The tape reel 4 is disposed on a side of the body 1 away from the roll-pressing device. The tape reel 4 is driven by a motor, and the tensioning wheel group is distributed along a length direction of the cantilever of the body 1 and is staggered in height in sequence, so that the tape 2 is placed on the tensioning wheel group in an S-shaped arrangement.

The driving wheel group is located below an end of the tension wheel group away from the tape reel 4. The driving wheel group comprises a driving wheel 7 and an adjusting wheel 8. The driving wheel 7 is driven by a second motor with a forward and reverse function, and the adjusting wheel 8 is adjusted by an adjusting bolt to adjust a distance between the adjusting wheel 8 and the driving wheel 7 so as to enable the tape 2 to pass between the driving wheel 7 and the adjusting wheel 8.

The tensioning wheel group comprises a plurality of tensioning wheels 5 and a lifting wheel 6. A lifting rail is disposed on the cantilever. The lifting wheel 6 slides on the lifting rail through a slider, and a lower end of the lifting rail comprises a position-limiting rod for preventing the lifting wheel 6 from disengaging from the lower end of the lifting rail. The tape 2 passes by the lower end of the lifting wheel 6. When the driving wheel 7 rotates in a reverse direction and drives the tape 2 to retreat, the lifting wheel 6 presses the tape 2 under an action of its own weight to maintain a tension state of the tape 2.

The roll-pressing device comprises a lower rubber wheel 30, an upper rubber wheel 29, and a first lifting assembly 31 for driving the upper rubber wheel 29 to ascend or descend. The roll-pressing device is used for roll-pressing and bonding the clothes and the tape 2.

The tape 2 wound on the tape reel 4 is pulled out and is wound along the tensioning wheel group, and the tape 2 then passes between the driving wheel 7 and the adjusting wheel 8. Then, the tape 2 enters the cloth guiding-and-heating device, and under a rolling traction of the roll-pressing device, the tape 2 performs a gluing process. During a delivering process for the tape 2, the tape reel 4 is rotated under driving of the motor, and the tape 2 is automatically sent out. The upper rubber wheel 29, the driving wheel 7, and the tape reel 4 rotate synchronously for pulling and guiding the tape 2 so as to make sure that delivering speeds of the tape 2 at positions contacting with the upper rubber wheel 29, the driving wheel 7, and the tape reel 4 are same. By actively delivering the tape 2 from the tape reel 4, a situation at which the tape 2 is pulled and broken due to excessive force can be effectively avoided.

The cloth guiding-and-heating device is described as follow.

The cloth guiding-and-heating device comprises a cloth guiding seat 9, a rotating seat 10, and a fixed seat 11. The cloth guiding seat 9 can be made of bakelite material (e.g., Polyoxybenzylmethylenglycolanhydride). The cloth guiding seat 9 comprises a first cloth guiding groove 12, a material guiding groove 14, and a second cloth guiding groove 13 which are arranged in sequence from bottom to top.

The first cloth guiding groove 12 has a first opening extending along one side of a width direction of the first cloth guiding groove 12, and the second cloth guiding groove 13 has a second opening extending along one side of a width direction of the second cloth guiding groove 13. The first opening and the second opening face away from each other, so that a first cloth of the clothes inserted from the first opening and a second cloth of the clothes inserted from the second opening partially overlap in the vertical projection plane. The first cloth guiding groove 12 is used for enabling the first cloth of the clothes to be inserted thereinto, so that the first cloth of the clothes can be pushed along a length direction of the first cloth guiding groove 12. The second cloth guide groove 13 is used for enabling the second cloth of the clothes to be inserted thereinto, so that the second cloth of the clothes can be pushed along a length direction of the second cloth guiding groove 13. Each of the first cloth and the second cloth has an overlapping part in the vertical projection plane. The material guiding groove 14 is used for enabling the tape 2 to pass therethrough, so that the tape 2 can be subsequently bonded between the overlapping part of the first cloth and the overlapping part of the second cloth.

The cloth guiding seat 9 is disposed with two blowing pipes 15, which are made of brass, at an exit of the material guiding groove 14, and an outside of each of the two blowing pipes 15 is covered with asbestos to avoid scalding the operator. The two blowing pipes 15 are vertically spaced apart from each so that the tape 2 can pass between the two blowing pipes 15. A length direction of the two blowing pipes 15 is the same as a width direction of the material guiding groove 14, and a blowing opening of each of the two blowing pipes 15 extends along the length direction of the two blowing pipes 15. Two of the blowing openings face the tape 2, and two of the blowing openings are inclined towards a side away from the cloth guiding seat 9. One end of each of the two blowing pipes 15 is threadedly connected to the cloth guiding seat 9 so that a blowing angle of each of the two blowing pipes can be adjusted. In this embodiment, an included angle between the blowing opening and the tape 2 is about 30 degrees.

In the present embodiment, the cloth guiding seat 9 comprises a communication hole 16 adjacent to a same side of the two blowing pipes 15, and each of the two blowing pipes 15 is in communication with the communication hole 16. The communication hole 16 is connected with a flexible hose, and the flexible hose is in communication with the hot air device. The flexible hose adopts a Teflon tube with high temperature resistance. After an upper side and a lower side of the tape 2 pass through hot air blown by the two blowing pipes the clothes and the tape 2 are bonded and connected by other subsequent devices. The flexible hose enables the cloth guiding seat 9 to be not affected when the cloth guiding seat 9 rotates.

The cloth guiding seat 9 comprises a first direction-changing roller 19 and a second direction-changing roller 20. The cloth guiding seat 9 comprises a first direction-changing opening 17 extending along a width direction of the material guiding groove 14, and the first direction-changing opening 17 and the first opening face a same side. The first direction-changing roller 19 is rotatably disposed on the first direction-changing opening 17 so that the tape 2 moves along the first direction-changing roller 19 to enter the material guiding groove 14. The cloth guiding seat 9 comprises a second direction-changing opening 18 at one end of the material guiding groove 14 away from the exit of the material guiding groove 14. The second direction-changing roller 20 is rotatably disposed on the second direction-changing opening 18, so that the tape 2 can enter the material guiding groove 14 from the first direction-changing opening 17, move along the first direction-changing roller 19, then move toward the second direction-changing opening 18 to move out of the material guiding groove 14, and then the tape 2 moves along the second direction-changing roller 20 to turn into the material guiding groove 14 so as to move in a direction in which the exit of the material guiding groove 14 faces. An include angle between the first direction-changing roller 19 and the second direction-changing roller 20 in the vertical projection plane is about 45 degrees, and each of the first direction-changing roller 19 and the second direction-changing roller 20 is disposed on the cloth guiding seat 9 through bearings. Through an arrangement of the first direction-changing roller 19 and the second direction-changing roller 20, the clothes moving along the first cloth guiding groove 12 and the second cloth guiding groove 13 do not interfere with the tape 2 and maintain normal operation.

Further, a partition plate 21 is disposed in the material guiding groove 14. One side of the partition plate 21 extends to the first direction-changing opening 17, and the other side of the partition plate 21 extends to the second direction-changing opening 18. The partition plate 21 divides the material guiding groove 14 into an upper layer and a lower layer. Wherein, an upper side (i.e., the upper layer) of the partition plate 21 is used for moving of the tape 2 toward the second direction-changing roller 20 after a direction of the tape 2 is changed by the first direction-changing roller 19, and a lower side (i.e., the lower layer) of the partition plate 21 is used for moving of the tape 2 toward the exit of the material guiding groove 14 after the direction of the tape 2 is changed by the second direction-changing roller 20. Since the tape 2 is flexible, when the tape 2 moves into the material guiding groove 14 for the first time, an arrangement of the partition plate 21 can easily enable the tape 2 to be inserted from the first direction-changing opening 17, and the tape 2 can easily pass out of the second direction-changing opening 18 using the partition plate 21. Then, the tape 2 exits from the exit of the material guiding groove 14 after passing by the second direction-changing roller 20 to be inserted into the lower layer.

The cloth guiding seat 9 comprises an elastic sheet 22 disposed in the material guiding groove 14, and the elastic sheet 22 is inclined toward the exit of the material guiding groove 14 from top to bottom. The elastic sheet 22 is used to enable the tape 2 to abut a bottom side wall of the material guiding groove 14, so that the tape 2 can be kept flat and will not easily move along the width direction of the material guiding groove 14. A lower end of the elastic sheet 22 abuts a position of the material guiding groove 14 adjacent to the exit. The elastic sheet 22 is detachably mounted on the cloth guiding seat 9. The cloth guiding seat 9 comprises an installation groove located on an upper end of an inner wall of the material guiding groove 14. An upper end of the elastic sheet 22 is integrally connected with a plug-in shaft 23. The plug-in shaft 23 is hollow inside, and a side wall is grooved along its length direction to make it have an elastically deformed ability. In absence of external force, an outer diameter of the plug-in shaft 23 is larger than a diameter of the installation groove, so that after the plug-in shaft 23 is inserted into the installation groove, the side wall of the plug-in shaft 23 abuts the installation groove to maintain stability and will not be easily moved axially in the installation groove.

Furthermore, in order to bond the tape 2 to corners or curved edges of the clothes. The cloth guiding seat 9 is fixedly disposed on the rotating seat 10, the rotating seat 10 is rotatably disposed on the fixed seat 11, and the fixed seat 11 is fixedly disposed on the countertop. In order to facilitate movement of the clothes, the countertop comprises a rotating hole in which the rotating seat 10 is located, and an upper end surface of the rotating seat 10 is flush with an upper end surface of the countertop. In this embodiment, a bottom groove wall of the first cloth guiding groove 12 is the upper end surface of the rotating seat 10.

An adjustment assembly for controlling a rotation angle of the rotating seat 10 is disposed on a bottom of the fixed seat 11. The adjustment assembly comprises an adjustment rod 24, a screw rod 25, and an adjustment block 26. The rotating seat 10 has a sector-shaped structure, and one side of a distal tip of the rotating seat 10 is pivotally connected on the fixed seat 11, so that the rotating seat 10 can rotate in a horizontal plane around a hinge position. The fixed seat 11 comprises an arc-shaped groove 27, and the arc-shaped groove 27 is centered on the hinge position of the rotating seat 10. The adjustment rod 24 is vertically connected to a bottom of the rotating seat 10 and extends to an outside of the fixed seat 11 through an adjusting hole.

The screw rod 25 is rotatably disposed on the bottom of the fixed seat 11, and an axial direction of the screw rod 25 is parallel to an axial direction of the two blowing pipes 15. The adjustment block 26 is sleeved on the screw rod 25 and is threadly connected with the screw rod 25. The adjustment block 26 comprises a clamping groove 28 along the length direction of the material guiding groove 14, so that the clamping groove 28 is clamped on two sides of the adjustment rod 24. An upper end of the adjustment block 26 abuts a bottom side wall of the fixed seat 11, so that when the screw rod 25 rotates, the adjustment block 26 moves axially along the screw rod 25 and the adjustment rod 24 moves with the adjustment block 26, thereby driving the rotating seat 10 to rotate. Two ends of the screw rod 25 are disposed with dials. The countertop comprises through holes, and the dials are exposed at the through holes, so that the operator can dial the dials from the upper end surface of the countertop to enable the rotating seat 10 to drive the cloth guiding seat 9 to rotate to facilitate a subsequent gluing process on the corners of the clothes, and the operation is simple. In other embodiments, a third motor may be used to drive the screw rod 25 to rotate, and then a button may be used to control a forward or reverse rotation of the third motor, thereby controlling the rotation angle of the rotating seat 10.

The roll-pressing device is described as follow.

The roll-pressing device comprises the lower rubber wheel 30, the upper rubber wheel 29, and the first lifting assembly 31 for driving the upper rubber wheel 29 to ascend or descend. The lower rubber wheel 30 is disposed on the bottom of the fixed seat 11, and each of the fixed seat 11 and the countertop comprises a position-providing hole. An upper end of the lower rubber wheel 30 passes through the fixed seat 11 and the countertop to be exposed above the countertop. The first lifting assembly 31 uses an air cylinder to drive the upper rubber wheel 29 to descend to achieve a purpose of bonding the clothes and the tape 2. The air cylinder is disposed at a distal end of the cantilever, and a piston rod of the air cylinder is connected to the upper rubber wheel 29 through a connecting arm.

The second motor drives the upper rubber wheel 29 and the lower rubber wheel 30 to rotate in the opposite direction synchronously, so that the clothes and the tape 2 clamped between the upper rubber wheel 29 and the lower rubber wheel 30 can be bonded and the clothes and the tape 2 are pushed out horizontally on the countertop in a direction away the operator. During a working process, linear speeds of the upper rubber wheel 29 and the driving wheel 7 are kept consistent. Compared with the traditional climbing rolling device, it is more convenient to push the clothes horizontally for the clothes with a larger area.

The plate-pressing device is described as follow.

The plate-pressing device comprises a lower pressing plate 33, an upper pressing plate 32, and a second lifting assembly 34 that drives the upper pressing plate 32 to ascend or descend. The second lifting assembly 34 uses a second air cylinder to drive the upper pressing plate 32 to descend, so as to achieve a purpose of bonding the clothes to the tape 2. Each of the upper pressing plate 32 and the lower pressing plate 33 are made of high-temperature-resistant and heat-conducting metal materials. An electric heating rod and a thermocouple sensor are disposed in the upper pressing plate 32 to achieve a purpose of heating and temperature control of the upper pressing plate 32. An upper end surface of the lower pressing plate 33 and an upper end surface of the lower rubber wheel 30 are substantially at a same height. In this embodiment, a contact surface between the upper pressing plate 32 and the lower pressing plate 33 is 50 mm×30 mm.

The hot air device is described as follow.

The hot air device comprises a first hot air device and a second hot air device. The first hot air device is located above the countertop of the body 1. The first hot air device comprises a first hot air pipe 35 and a first air outlet pipe 36, and a first air passage switching member 37 is connected between the first hot air pipe 35 and the first air outlet pipe 36. The first air passage switching member 37 is used to control a connection or a disconnection between the first hot air pipe 35 and the first air outlet pipe 36. An air outlet 45 of the first air outlet pipe 36 faces the upper rubber wheel 29 and an upper layer of the clothes to blow the hot air onto heat the upper rubber wheel 29 and the upper layer of the clothes.

The second hot air device comprises a second hot air pipe 38 and a second air outlet pipe 39, and the second hot air device is disposed at a bottom of the countertop. A second air passage switching member 40 is connected between the second hot air pipe 38 and the second air outlet pipe 39. The second air passage switching member 40 is used to control a connection or a disconnection between the second hot air pipe 38 and the second air outlet pipe 39. A side wall of the second air outlet pipe 39 comprises a first air outlet 48, and the first air outlet 48 faces the lower rubber wheel 30 and a lower layer of the clothes. A distal end of the second air outlet pipe 39 is in communication with the flexible hose disposed in the communication hole 16 on the cloth guiding seat 9 to provide the hot air to the two blowing pipes 15. Each of the first hot air pipe 35 and the second hot air pipe 38 is in communication with a blowing device, so that the heat air inside the first hot air pipe 35 and the second hot air pipe 38 can be blown out.

The first air passage switching member 37 comprises a switching sleeve 41 and a movable plug 42. The switching sleeve 41 is wrapped with a bakelite heat insulation board and then fixedly connected on the connecting arm, so that the first hot air device and the upper rubber wheel 29 ascend or descend synchronously. An air exhausting outlet 43, an air inlet 44, and the air outlet 45 are sequentially formed on a side wall of the switching sleeve 41 from top to bottom. The air inlet 44 is in communication with the first hot air pipe 35, the air outlet 45 is in communication with the first air outlet pipe 36, and the air exhausting outlet 43 is connected with a first air exhausting pipe 46. The movable plug 42 is movably disposed in the switching sleeve 41, and the movable plug 42 is driven by an air cylinder to move in an axial direction of the switching sleeve 41.

In a vertical direction, when the movable plug 42 is located between the air inlet 44 and the air outlet 45, a connection between the air inlet 44 and the air outlet 45 is cut off, and the air inlet 44 is in communication with the air exhausting outlet 43. When the movable plug 42 is located between the air inlet 44 and the air exhausting outlet 43, the connection between the air inlet 44 and the air exhausting outlet 43 is cut off, and the air inlet 44 is in communication with the air outlet 45 to supply the hot air to the clothes and the upper rubber wheel 29. The second air passage switching member 40 has the same structure as the first air passage switching member 37, and the second air passage switching member 40 is connected with a second air exhausting pipe 47. Through an arrangement of the first air passage switching member 37 and the second air passage switching member 40, the operator can control whether the first air outlet pipe 36 or the second air outlet pipe 39 supplies the hot air or not according to an actual situation. The first hot air pipe 35, the first air outlet pipe 36, and the first air exhausting pipe 46 are all wrapped with asbestos to avoid scalding the operator. Similarly, the second hot air pipe 38, the second air outlet pipe 39, and the second air exhausting pipe 47 are also wrapped with asbestos.

The present disclosure also discloses a method of using the bonding device, which comprises the following steps:

S1: pulling out the tape 2 wound on the tape reel 4, and winding the tape 2 along the tensioning wheel group and the driving wheel group in sequence to make the tape 2 pass through the cloth guiding-and-heating device;

S2: pulling the tape 2 to the lower pressing plate 33;

S3: inserting the first layer of the clothes into the first cloth guiding groove 12, and pushing the first layer of the clothes along the first cloth guiding groove 12 to move to the lower pressing plate 33 so as to make the first layer of the clothes located under the tape 2;

S4: inserting the second layer of the clothes into the second cloth guiding groove 13, and pushing the second layer of the clothes along the second cloth guiding groove 13 to move to the lower pressing plate 33 so as to make the second layer of the clothes located above the tape 2.

S5: starting the plate-pressing device, after the upper pressing plate 32 is heated, making the upper pressing plate 32 move toward the lower pressing plate 33 so as to enable the first layer of the clothes, the second layer of the clothes, and a beginning of the tape 2 to be bonded together, and making the upper pressing plate 32 be lifted;

S6: making the driving wheel 7 drive the tape 2 to retreat, and simultaneously pushing the first layer of the clothes and the second layer of the clothes to retreat so that the beginning of the tape 2, that has been bonded to the clothes, retreats to between the upper rubber wheel 29 and the lower rubber wheel 30, starting the roll-pressing device, making the upper rubber wheel 29 press toward the lower rubber wheel 30, making the hot air device supply the hot air to the upper rubber wheel 29, the lower rubber wheel 30, the first layer of the clothes, the second layer of the clothes, and the tape 2, and making the upper rubber wheel 29 and the lower rubber wheel 30 rotate to enable the first layer of the clothes, the second layer of the clothes, and the tape 2 be roll-pressed and bonded together and be pushed toward a direction away from the operator; wherein: a temperature at air openings of the first air outlet pipe 36 and the second air outlet pipe 39 reaches about 450° C., and a pushing speed of the clothes is about 11 m/min.

S7: when other objects need to be bonded into the clothes which are unbonded, such as small objects such as hook-and-latch (e.g., Velcro) that has been pre-bonded on the clothes, pull lugs for a windproof rope, etc., suspending the roll-pressing device, and making the first air passage switching member 37 switch the hot air to be discharged from the first air exhausting pipe 46, making the second air passage switching member 40 switch the hot air to be discharged from the second air exhausting pipe 47, and moving a portion to be bonded to the plate-pressing device for bonding; wherein: a temperature of the upper pressing plate 32 reaches about 140° C., and a pressing time of the upper pressing plate 32 and the lower pressing plate 33 is about 6 s; and then repeating the step S6;

S8, when a distal end of the first layer of the clothes and a distal end of the second layer of the clothes need to be ended and bonded, suspending the roll-pressing device, and moving the distal end of the first layer of the clothes and the distal end of the second layer of the clothes to the plate-pressing device for thermal bonding.

S9: after completing a bonding of a product, cutting the tape 2; and repeating steps S2-S8 to continue a bonding of a next product.

It should be noted that the clothes can be made of polyester fabric and can also be replaced with polyvinyl chloride (PVC) film.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A bonding device, comprising:
a body,
a cloth guiding-and-heating device,
a roll-pressing device,
a plate-pressing device,
a hot air device, and
a tape-delivering device, wherein:
the cloth guiding-and-heating device, the roll-pressing device, the plate-pressing device, and the tape-delivering device are disposed on the body,
the cloth guiding-and-heating device comprises a cloth guiding seat,
the cloth guiding seat comprises a first cloth guiding groove, a material guiding groove, and a second cloth guiding groove which are spaced apart from one another and arranged in sequence from bottom to top,
the first cloth guiding groove has a first opening extending along one side of a width direction of the first cloth guiding groove,
the second cloth guiding groove has a second opening extending along one side of a width direction of the second cloth guiding groove,
the first opening and the second opening face away from each other,
the first opening and the second opening are configured to respectively receive a first cloth and a second cloth to enable the first cloth and the second cloth to partially overlap each other in a vertical projection plane,
the material guiding groove is configured to guide tape to enable the tape to enter between the first cloth and the second cloth partially overlapped in the vertical projection plane,
the cloth guiding seat is disposed with two blowing pipes at an exit of the material guiding groove,
the two blowing pipes are spaced apart from each other so that the tape is configured to pass between the two blowing pipes,
the two blowing pipes are in communication with the hot air device,
the roll-pressing device comprises a lower rubber wheel, an upper rubber wheel, and a first lifting assembly for driving the upper rubber wheel to ascend or descend,
the roll-pressing device is configured for roll-pressing and bonding the first cloth, the second cloth, and the tape,
the plate-pressing device comprises a lower pressing plate, an upper pressing plate, and a second lifting assembly for driving the upper pressing plate to ascend or descend, and
the plate-pressing device is configured for plate-pressing and bonding the first cloth, the second cloth, and the tape.

2. The bonding device according to claim 1, wherein:
the hot air device comprises a first hot air device located above a countertop of the body and a second hot air device located below the countertop of the body,
the first hot air device comprises a first hot air pipe and a first air outlet pipe,
a first air passage switching member is connected between the first hot air pipe and the first air outlet pipe,
the first air passage switching member is configured to control a connection or a disconnection between the first hot air pipe and the first air outlet pipe,
the first hot air pipe is configured to supply hot air to heat the upper rubber wheel and the second cloth,
the second hot air device comprises a second hot air pipe and a second air outlet pipe,
a second air passage switching member is connected between the second hot air pipe and the second air outlet pipe,
the second air passage switching member is configured to control a connection or a disconnection between the second hot air pipe and the second air outlet pipe,
an upper end of the lower rubber wheel is exposed above the countertop to enable the clothes and tape to be horizontally pushed along a surface of the countertop when the clothes and tape are being bonded between the upper rubber wheel and the lower rubber wheel,
a side wall of the second air outlet pipe comprises a first air outlet,
the first air outlet faces the lower rubber wheel and the first cloth, and
a distal end of the second air outlet pipe is in communication with the two blowing pipes.

3. The bonding device according to claim 2, wherein:
the first air passage switching member comprises a switching sleeve and a movable plug,
an air exhausting outlet, an air inlet, and an air outlet for the first air outlet pipe are sequentially formed on the switching sleeve,
the air inlet is in communication with the first hot air pipe,
the air outlet is in communication with the first air outlet pipe,
the air exhausting outlet is connected with a first air exhausting pipe,
the movable plug is movably disposed in the switching sleeve,
when the movable plug blocks communication between the air exhausting outlet and the air inlet, the air inlet is in communication with the air outlet,
when the movable plug blocks communication between the air outlet and the air inlet, the air inlet is in communication with the air exhausting outlet, and
the first air passage switching member has the same structure as the second air passage switching member.

4. The bonding device according to claim 1, wherein:
the cloth guiding seat comprises a first direction-changing roller and a second direction-changing roller,
the cloth guiding seat comprises a first direction-changing opening extending along a width direction of the material guiding groove,
the first direction-changing opening and the first opening face a same side,
the first direction-changing roller is rotatably disposed on the first direction-changing opening so that the tape is configured to move along the first direction-changing roller to enter the material guiding groove,
the cloth guiding seat comprises a second direction-changing opening at one end of the material guiding groove away from the exit of the material guiding groove, and
the second direction-changing roller is rotatably disposed on the second direction-changing opening, so that the tape is configured to enter the material guiding groove from the first direction-changing opening, move along the first direction-changing roller, then move toward the second direction-changing opening to move out of the material guiding groove, and then move along the second direction-changing roller to turn into the material guiding groove so as to move in a direction in which the exit of the material guiding groove faces.

5. The bonding device according to claim 4, wherein:
a partition plate is disposed in the material guiding groove to divide the material guiding groove into an upper layer and a lower layer,
the upper layer of the material guiding groove is configured for moving the tape toward the second direction-changing roller after a direction of the tape is changed by the first direction-changing roller, and
the lower layer of the material guiding groove is configured for moving the tape toward the exit of the material guiding groove after the direction of the tape is changed by the second direction-changing roller.

6. The bonding device according to claim 1, wherein:
the cloth guiding-and-heating device comprising a rotating seat and a fixed seat,
the cloth guiding seat is disposed on the rotating seat,
the rotating seat is rotatably disposed on the fixed seat,
the fixed seat is disposed on a bottom a countertop, and
an adjustment assembly for controlling a rotation angle of the rotating seat is disposed on the fixed seat.

7. The bonding device according to claim 6, wherein:
the adjustment assembly comprises an adjustment rod, a screw rod, and an adjustment block,
the screw rod is rotatably disposed on a bottom of the fixed seat,
the adjustment block is sleeved on the screw rod and is threadly connected with the screw rod,
one end of the rotating seat is pivotally connected to the fixed seat to enable the rotating seat to rotate in a horizontal plane,
the fixed seat comprises an arc-shaped groove,
the arc-shaped groove is centered on a hinge position of the rotating seat,
the adjustment rod is connected to the rotating seat and extends through the arc-shaped groove, and
the adjustment block comprises a clamping groove clamped on two sides of the adjustment rod.

8. The bonding device according to claim 1, wherein:
the tape-delivering device comprises a tape reel, a tensioning wheel group, and a driving wheel group,
the tape is configured to be wound on the tape reel, the tensioning wheel group, and the driving wheel group in sequence before entering the cloth guiding-and-heating device,
the tensioning wheel group has a plurality of wheels staggered relative to each other so the tape is wound on the tensioning wheel group along a staggered path in height,
the driving wheel group comprises a driving wheel and an adjusting wheel,
the driving wheel is configured to be driven by a second motor with a forward and reverse function,
the adjusting wheel is configured to be adjusted by an adjusting bolt to adjust a distance between the adjusting wheel and the driving wheel so as to enable the tape to pass between the driving wheel and the adjusting wheel,
the tape reel is configured to be driven by a motor, and the tape reel and the driving wheel are configured to rotate synchronously to enable delivering speeds of the tape at positions wound on the tape reel and the driving wheel to be same.

9. The bonding device according to claim 8, wherein:
the tensioning wheel group comprises the plurality of tensioning wheels and a lifting wheel,
a lifting rail is disposed on the body,
the lifting wheel slides on the lifting rail through a slider,
a lower end of the lifting rail comprises a position-limiting rod for preventing the lifting wheel from disengaging from the lower end of the lifting rail,
the tape is configured to pass by the lower end of the lifting wheel, and
when the driving wheel rotates in a reverse direction and drives the tape to retreat, the lifting wheel presses the tape under an action of a weight of the lifting wheel to maintain a tension state of the tape.

10. A method of using the bonding device according to claim 1, comprising the following steps:
S1: pulling out the tape wound on a tape reel, and winding the tape along a tensioning wheel group and a driving wheel group in sequence to make the tape pass through the cloth guiding-and-heating device;
S2: pulling the tape to the lower pressing plate;
S3: inserting the first cloth into the first cloth guiding groove, and pushing the first cloth along the first cloth guiding groove to move to the lower pressing plate so as to locate the first cloth under the tape;
S4: inserting the second cloth into the second cloth guiding groove, and pushing the second cloth along the second cloth guiding groove to move to the lower pressing plate so as to locate the second cloth layer of the cloths located above the tape;
S5: starting the plate-pressing device, after the upper pressing plate is heated, moving the upper pressing plate toward the lower pressing plate so as to enable the first cloth, the second cloth, and a beginning of the tape to be bonded together, and lifting the upper pressing plate;
S6: starting the roll-pressing device, making the upper rubber wheel press toward the lower rubber wheel, making the hot air device supply hot air to the upper rubber wheel, the lower rubber wheel, the first cloth, the second cloth, and the tape, and making the upper rubber wheel and the lower rubber wheel rotate to roll-press and bond the first cloth, the second cloth, and the tape together while the first cloth, the second cloth, and the tape move away from an operator;
S7: thermally bonding a distal end of the first cloth and a distal end of the second cloth, in the plate-pressing device by suspending the roll-pressing device, and moving the distal end of the first cloth and the distal end of the second cloth to the plate-pressing device for the thermal bonding; and
S8: after completing the thermal bonding, cutting the tape; and repeating steps S2-S7 to bond a next product.

* * * * *